(12) United States Patent
Tachikawa et al.

(10) Patent No.: US 12,049,161 B2
(45) Date of Patent: Jul. 30, 2024

(54) VEHICLE SEAT

(71) Applicant: TS TECH CO., LTD., Asaka (JP)

(72) Inventors: Yoichi Tachikawa, Tochigi (JP);
Tsukasa Meguro, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 229 days.

(21) Appl. No.: 17/788,918

(22) PCT Filed: Jan. 15, 2020

(86) PCT No.: PCT/JP2020/001130
§ 371 (c)(1),
(2) Date: Jun. 24, 2022

(87) PCT Pub. No.: WO2021/131079
PCT Pub. Date: Jul. 1, 2021

(65) Prior Publication Data
US 2023/0034001 A1 Feb. 2, 2023

Related U.S. Application Data

(60) Provisional application No. 62/954,034, filed on Dec. 27, 2019.

(51) Int. Cl.
*B60N 2/42* (2006.01)
*B60N 2/12* (2006.01)

(52) U.S. Cl.
CPC ............ *B60N 2/4263* (2013.01); *B60N 2/12* (2013.01)

(58) Field of Classification Search
CPC ........ B60N 2/4263; B60N 2/305; B60N 2/12; B60N 2/01583
See application file for complete search history.

(56) References Cited

U.S. PATENT DOCUMENTS 5,971,466 A * 10/1999 Hashimoto ............ B60N 2/305
297/452.56
6,334,643 B1 * 1/2002 Lindblad .............. B60N 2/4228
296/65.09
(Continued)

FOREIGN PATENT DOCUMENTS

JP    H10147165     6/1998
JP    2000309239    11/2000
(Continued)

OTHER PUBLICATIONS

PCT International Search Report (w/ English translation) for corresponding PCT Application No. PCT/JP2020/001130, mailed on Mar. 24, 2020, 5 pages.

*Primary Examiner* — Mark R Wendell
(74) *Attorney, Agent, or Firm* — Dority & Manning, P.A.

(57) ABSTRACT

Provided is a vehicle seat configured such that a relatively smaller space is formed under a seat cushion when the seat cushion is tilted frontward. A vehicle seat comprises a rail device including lower and upper rails; a seat cushion; a seat back; and a hinge device with a rotation axis for rotatably connecting the upper rail and the seat cushion at their front parts; and a coupling device for detachably connecting the seat cushion and the upper rail at their rear parts. A seat cushion frame of the seat cushion includes side members, front and rear members, and a submarining prevention member located rearward of the front member, extending in a crosswise direction, and coupled to the side members. The rotation axis is located rearward of a central axis of the submarining prevention member.

16 Claims, 12 Drawing Sheets

(56) References Cited

U.S. PATENT DOCUMENTS

| | | | | |
|---|---|---|---|---|
| 6,428,102 B1* | 8/2002 | Becker | ............... | B60N 2/0284 |
| | | | | 297/337 |
| 2007/0138847 A1* | 6/2007 | Gundall | ................ | B60N 2/43 |
| | | | | 297/216.1 |
| 2009/0160228 A1* | 6/2009 | Houston | ............. | B60N 2/4279 |
| | | | | 297/216.2 |
| 2019/0092191 A1* | 3/2019 | Bouzid | ............. | B60N 2/02246 |
| 2019/0118678 A1* | 4/2019 | Stevens | ................ | B60N 2/06 |
| 2020/0101872 A1* | 4/2020 | Epaud | ............... | B60N 2/3031 |

FOREIGN PATENT DOCUMENTS

| | | |
|---|---|---|
| JP | 2001047918 | 2/2001 |
| JP | 2005053245 | 3/2005 |
| JP | 2019202575 | 11/2019 |

* cited by examiner

Fig.7
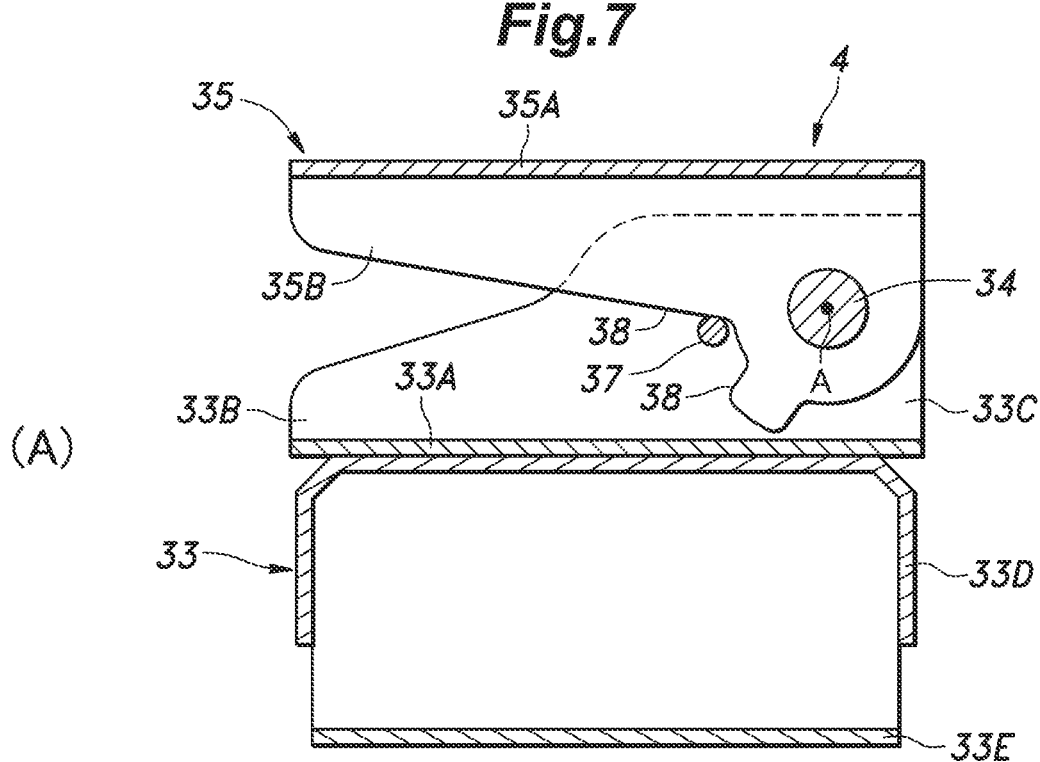
(A)
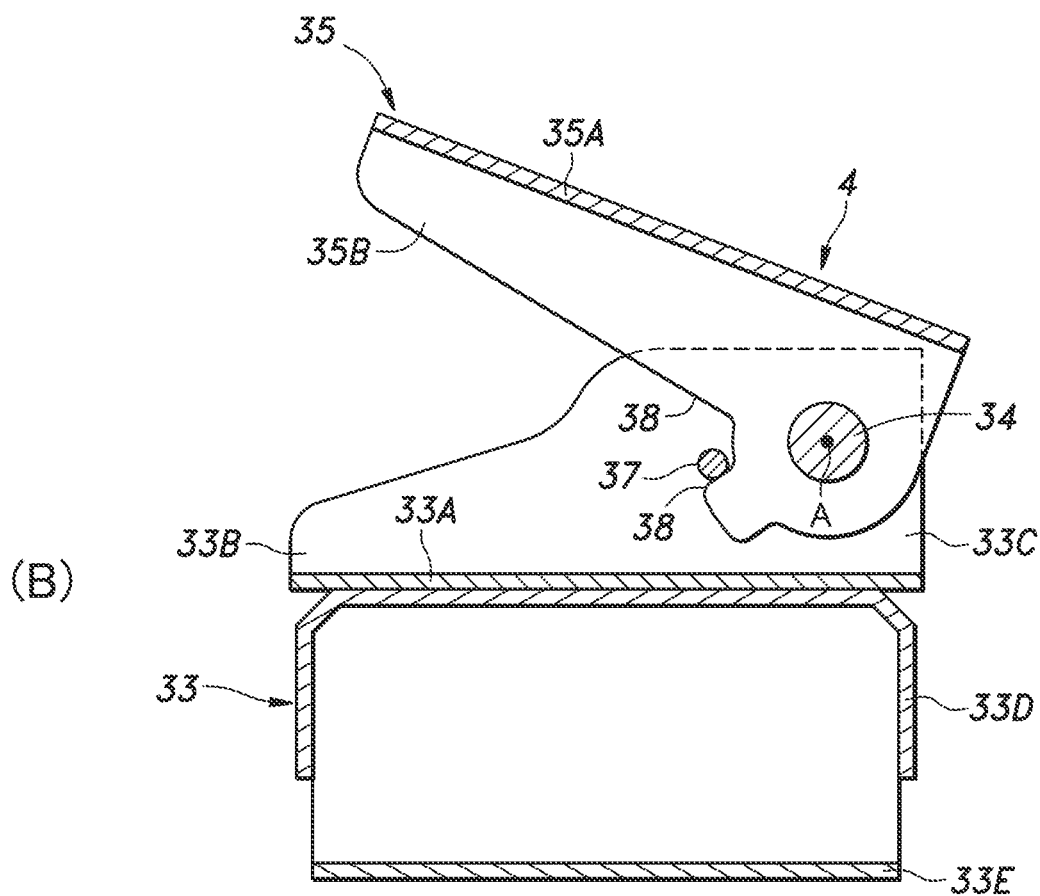
(B)

VEHICLE SEAT

CROSS REFERENCE TO RELATED APPLICATIONS

This application is the U.S. National Stage entry of International Application No. PCT/JP2020/001130 filed under the Patent Cooperation Treaty on Jan. 15, 2020, which claims priority to U.S. Provisional Patent Application No. 62/954,034 filed on Dec. 27, 2019, both of which are incorporated herein by reference.

TECHNICAL FIELD

The present invention relates to a vehicle seat.

BACKGROUND ART

Patent Document 1 teaches a vehicle seat including a slide rail device and a seat cushion coupled to an upper rail of the slide rail device via a hinge bracket. The hinge bracket rotatably connects a front end part of the upper rail and a front end part of the seat cushion, which enables the vehicle seat to be tilted frontward.

PRIOR ART DOCUMENT(S)

Patent Document(s)

Patent Document 1: JPH10-147165A

SUMMARY OF THE INVENTION

Task to be Accomplished by the Invention

When such a seat is tilted frontward, the seat gives a rear seat passenger easy entry and access to a rear seat. However, when an amount of lift at the rear part of the tilted seat is too large, a relatively larger space is formed under the seat cushion, which can lead to a higher risk that the passenger steps into the space. To allow a passenger to step into the space under the seat cushion is undesirable because rail devices and other structural components of the seat are provided in that space.

The present invention has been made in view of the problem of the prior art, and a primary object of the present invention is to provide a vehicle seat configured such that a relatively smaller space is formed under a seat cushion when the vehicle seat is tilted frontward,

Means to Accomplish the Task

As a solution to the above-described problem, an aspect of the present invention provides a vehicle seat (1), comprising: a seat body (8) including a seat cushion (6) for supporting buttocks of a passenger, and a seat back (7) extending upward from a rear part of the seat cushion; and at least one mechanical structure, each mechanical structure comprising: a rail device (3) provided on a floor (2), the rail device including a lower rail (11) extending in a lengthwise direction, the lengthwise direction being a front-rear direction of a vehicle, and an upper rail (12) supported by the lower rail; a hinge device (4) for rotatably connecting a front part of the upper rail and a front part of the seat cushion, the hinge device having a rotation axis (A) which extends in a crosswise direction perpendicular to the lengthwise direction; and a coupling device (5) for detachably connecting the rear part of the seat cushion and a rear part of the upper rail, wherein the seat cushion is provided with a seat cushion frame (20), the seat cushion frame comprising: left and right side members (23) extending in the lengthwise direction; a front member (24) extending in the crosswise direction and coupled to respective front end portions of the left and right side members; a rear member (25) extending in the crosswise direction and coupled to respective rear end portions of the left and right side members; and a submarining prevention member (26) located rearward of the front end of the front member, extending in the crosswise direction, and coupled to the left and right side members, and wherein the rotation axis of the hinge device is located rearward of a central axis of the submarining prevention member.

This configuration can reduce an amount of lift at the rear part of the tilted seat cushion per a certain change in the angle of tilt of the seat cushion, compared to the case that the rotation axis is provided at the front end of the seat cushion. As a result, a relatively smaller space is formed under the seat cushion when the seat is tilted frontward.

The above vehicle seat may be further configured such ha the submarining prevention member is a cylindrical pipe.

In this configuration, the seat cushion frame can be made to have a simple structure.

The above vehicle seat may be further configured such that the submarining prevention member is located rearward of the rear end of the front member.

In this configuration, the rotation axis is located closer to the center of the seat cushion than the submarining prevention member in the lengthwise direction. As a result, a relatively smaller space is formed under the seat cushion when the seat cushion is tilted frontward.

The above vehicle seat may be further configured such that the rotation axis is located frontward of the rear end of the submarining prevention member.

This configuration can reduce an amount of lift at the rear part of the seat cushion while simultaneously reducing an amount of drop at the front part of the seat cushion when the seat cushion is tilted frontward.

The above vehicle seat may be further configured such ha the rotation axis extends above the upper rail and is located at the same position along the lengthwise direction as or rearward of the front end of the upper rail.

In this configuration, since the rotation axis is located above the upper rail, even when the seat cushion is tilted frontward, a load is applied downward from the seat cushion to the upper rail via the hinge device. As a result, the upper rail can support the seat cushion in a stable manner.

The above vehicle seat may be further configured such that the seat cushion includes a pad (21) supported by the seat cushion frame and a skin material (22) configured to cover the pad, wherein the seat cushion frame is provided with a skin material supporter (31) which extends downward from at least one of the left and right side members and can secure an edge portion of the skin material in place, and wherein the rotation axis is located on the same level or above the lower end of the skin material supporter.

In this configuration, the rotation axis is located near the side members, which reduces an amount of upward or downward movement at the rear part of the seat cushion as the angle of the seat cushion changes.

The above vehicle seat may be further configured such that the rotation axis is located below the lower ends of the left and right side members.

In this configuration, the hinge device can be located below the side members, thereby enabling the vehicle seat to have a simple structure.

The above vehicle seat may be further configured such that each mechanical structure further comprises a mounting member (13), the mounting member having a rear end portion coupled to the front end of the lower rail, and a front end portion located frontward of the front end of the lower rail and coupled to the floor, wherein, when the upper rail is located its frontmost position relative to the lower rail, the rotation axis is located rearward of the front end of the mounting member.

In this configuration, the rotation axis is located above at least one of the mounting member and the lower rail. As a result, even when the seat cushion is tilted frontward, the seat cushion can be stably supported by the mounting member and the lower rail.

The above vehicle seat may be further configured such that the mounting member is provided with a fastening portion (13A) to be fastened to the floor, and wherein, when the upper rail is located its frontmost position relative to the lower rail, the rotation axis is located rearward of the fastening portion.

In this configuration, even when the seat cushion is tilted frontward, the seat cushion can be stably supported by the mounting member and the lower rail.

The above vehicle seat may be further configured such that the coupling device includes: a striker (41) provided on one of the upper rail and the seat cushion frame; and a locking device (42) provided on the other of the upper rail and the seat cushion frame and configured to detachably lock the striker, and wherein the rotation axis is located above the upper end of the locking device.

In this configuration, the rotation axis is located near the side members, which reduces an amount of upward or downward movement at the rear part of the seat cushion as the angle of the seat cushion changes.

The above vehicle seat may be further configured such that the vehicle seat comprises at least two of the mechanical structures, and wherein, for each mechanical structure, the hinge device comprises: a first member (33) to be connected to the upper rail; a shaft (34) supported by the first member and extending in the crosswise direction; a second member (35) rotatably supported by the shaft and coupled to a corresponding one of the left and right side members, a first restriction portion (37) provided on one of the first member and the second member; and a second restriction portion (38) provided on the other of the first member and the second member so that the second restriction portion can abut the first restriction portion to thereby restrict the relative rotation of the second member to the first member, defining a relative rotation range.

In this configuration, since the first and second restriction portions are coupled to the hinge device so as to restrict the rotation to a certain rotation range, the vehicle seat can be made simple.

The above vehicle seat may be further configured such that the first member has a greater width measured in the crosswise direction than the lower rail and protrudes more inward than the lower rail.

In this configuration, even when a larger hinge device is used to achieve an increased rigidity, the outer shape of the vehicle seat becomes less affected by the use of such a larger hinge device.

The above vehicle seat may be further configured such that the first member comprises a first base portion (33A) coupled to the upper rail, and left and right first side wall portions (33B) extending upward from the first base portion and spaced apart from each other in the crosswise direction, wherein the second member comprises a second base portion (35A) coupled to a corresponding one of the left and right side members, and left and right second side wall portions (35B) extending downward from the second base portion and spaced apart from each other in the crosswise direction, wherein the left and right first side wall portions are located between the left and right second side wall portions in the crosswise direction, and wherein the shaft extends in the crosswise direction through the left and right first side wall portions and through the left and right second side wall portions.

In this configuration, the hinge device can support the seat cushion over a large area, thereby improving the stability of the seat cushion.

The above vehicle seat may be further configured such that each mechanical structure is provided with an urging device (51) configured to be telescopically expandable along a straight line, the urging device having a first end (51C) coupled to the first member and a second end (51D) coupled to the rear end of a corresponding one of the left and right side members, and wherein the urging device tends to expand, providing an urging; force.

In this configuration, the vehicle seat can be moved to the frontward tilted position with the urging device.

The above vehicle seat may be further configured such ha the first member extends out frontward of the rotation axis, and wherein the first end of the urging device is located frontward of the rotation axis.

This configuration can reduce the resistance to movement of the seat cushion provided by the cylinder device when the seat cushion is returned from the frontward tilted position to the initial portion.

The above vehicle seat may be further configured such that, when the seat body is in a frontward tilted position in which the seat body is tilted frontward about the rotation axis, the rotation axis is on a straight line (B) connecting the first end and the second end as viewed in the crosswise direction.

This configuration can reduce the resistance to movement of the seat cushion provided by the cylinder device when the seat cushion is returned from the frontward tilted position to the initial portion.

Effect of the Invention

An aspect of the present invention provides a vehicle seat (1), comprising: a seat body (8) including a seat cushion (6) for supporting buttocks of a passenger, and a seat back (7) extending upward from a rear part of the seat cushion; and at least one mechanical structure, each mechanical structure comprising: a rail device (3) provided on a floor (2), the rail device including a lower rail (11) extending in a lengthwise direction, the lengthwise direction being a front-rear direction of a vehicle, and an upper rail (12) supported by the lower rail; a hinge device (4) for rotatably connecting a from part of the upper rail and a front part of the seat cushion, the hinge device having a rotation axis (A) which extends in a crosswise direction perpendicular to the lengthwise direction; and a coupling device (5) for detachably connecting the rear part of the seat cushion and a rear part of the upper rail, wherein the seat cushion is provided with a seat cushion frame (20), the seat cushion frame comprising: left and right side members (23) extending in the lengthwise direction; a front member (24) extending in the crosswise direction and coupled to respective front end portions of the left and right side members; a rear member (25) extending in the crosswise direction and coupled to respective rear end portions of the left and right side members; and a submarining prevention member (26) located rearward of the front end of the front member, extending in the crosswise direction, and coupled to the left and right side members, and wherein the rotation axis of the hinge device is located rearward of a central axis of the submarining prevention member.

The above vehicle seat may be further configured such that the submarining prevention member is a cylindrical pipe. In this configuration, the seat cushion frame can be made to have a simple structure.

The above vehicle seat may be further configured such that the submarining prevention member is located rearward of the rear end of the front member. In this configuration, the rotation axis is located closer to the center of the seat cushion than the submarining prevention member in the lengthwise direction. As a result, a relatively smaller space is formed under the seat cushion when the seat cushion is tilted frontward.

The above vehicle seat may be further configured such that the rotation axis is located frontward of the rear end of the submarining prevention member. This configuration can reduce an amount of lift at the rear part of the seat cushion while simultaneously reducing an amount of drop at the front part of the seat cushion when the seat cushion is tilted frontward.

The above vehicle seat may be further configured such that the rotation axis extends above the upper rail and is located at the same position along the lengthwise direction as or rearward of the front end of the upper rail. In this configuration, since the rotation axis is located above the upper rail, even when the seat cushion is tilted frontward, a load is applied downward from the seat cushion to the upper rail via the hinge device. As a result, the upper rail can support the seat cushion in a stable manner.

The above vehicle seat may be further configured such that the seat cushion includes a pad (21) supported by the seat cushion frame and a skin material (22) configured to cover the pad, wherein the seat cushion frame is provided with a skin material supporter (31) which extends downward from at least one of the left and right side members and can secure an edge portion of the skin material in place, and wherein the rotation axis is located on the same level or above the lower end of the skin material supporter. In this configuration, the rotation axis is located near the side members, which reduces an amount of upward or downward movement at the rear part of the seat cushion as the angle of the seat cushion changes.

The above vehicle seat may be further configured such that the rotation axis is located below the lower ends of the left and right side members. In this configuration, the hinge device can be located below the side members, thereby enabling the vehicle seat to have a simple structure.

The above vehicle seat my be further configured such that each mechanical structure further comprises a mounting member (13), the mounting member having a rear end portion coupled to the front end of the lower rail, and a front end portion located frontward of the front end of the lower rail and coupled to the floor, wherein, when the upper rail is located its frontmost position relative to the lower rail, the rotation axis is located rearward of the front end of the mounting member. In this configuration, the rotation axis is located above at least one of the mounting member and the lower rail. As a result, even when the seat cushion is tilted frontward, the seat cushion can be stably supported by the mounting member and the lower rail.

The above vehicle seat may be further configured such that the mounting member is provided with a fastening portion (13A) to be fastened to the floor, and wherein, when the upper rail is located its frontmost position relative to the lower rail, the rotation axis is located rearward of the fastening portion. In this configuration, even h the seat cushion is tilted frontward, the seat cushion can be stably supported by the mounting member and the lower rail.

The above vehicle seat may be further configured such that the coupling device includes: a striker (41) provided on one of the upper rail and the seat cushion frame; and a locking device (42) provided on the other of the upper rail and the seat cushion frame and configured to detachably lock the striker, and wherein the rotation axis is located above the upper end of the locking device. In this configuration, the rotation axis is located near the side members, which reduces an amount of upward or downward movement at the rear part of the seat cushion as the angle of the seat cushion changes.

The above vehicle seat may be further configured such that the vehicle seat comprises at least two of the mechanical structures, and wherein, for each mechanical structure, the hinge device comprises: a first member (33) to be connected to the upper rail; a shaft (34) supported by the first member and extending in the crosswise direction; a second member (35) rotatably supported by the shaft and coupled to a corresponding one of the left and right side members, a, first restriction portion (37) provided on one of the first member and the second member; and a second restriction portion (38) provided on the other of the first member and the second member so that the second restriction portion can abut the first restriction portion to thereby restrict the relative rotation of the second member to the first member, defining a relative rotation range. In this configuration, since the first and second restriction portions are coupled to the hinge device so as to restrict the rotation to a certain rotation range, the vehicle seat can be made simple.

The above vehicle seat may be further configured such that the first member has a greater width measured in the crosswise direction than the lower rail and protrudes more inward than the lower rail. In this configuration, even when a larger hinge device is used to achieve an increased rigidity, the outer shape of the vehicle seat becomes less affected by the use of such a larger hinge device.

The above vehicle seat may be further configured such that the first member comprises a first base portion (33A) coupled to the upper rail, and left and right first side wall portions (33B) extending upward from the first base portion and spaced apart from each other in the crosswise direction, wherein the second member comprises a second base portion (35A) coupled to a corresponding one of the left and right side members, and left and right second side wall portions (35B) extending downward from the second base portion and spaced apart from each other in the crosswise direction, wherein the left and right first side wall portions are located between the left and right second side wall portions in the crosswise direction, and wherein the shall extends in the crosswise direction through the left and right first side wall portions and through the left and right second side wall portions. In this configuration, the hinge device can support the seat cushion over a large area, thereby improving the stability of the seat cushion.

The above vehicle seat may be further configured such that each mechanical structure is provided with an urging device (51) configured to be telescopically expandable along a straight line, the urging device having a first end (51C) coupled to the first member and a second end (51D) coupled to the rear end of a corresponding one of the left and right side members, and wherein the urging device tends to expand, providing an urging force. In this configuration, the vehicle seat can be moved to the frontward tilted position with the urging device.

The above vehicle seat may be further configured such that the first member extends out frontward of the rotation axis, and wherein the first end of the urging device is located frontward of the rotation axis. This configuration can reduce the resistance to movement of the seat cushion provided by the cylinder device when the seat cushion is returned from the frontward tilted position to the initial portion.

The above vehicle seat may be further configured such that, when the seat body is in a frontward tilted position in which the seat body is tilted frontward about the rotation axis, the rotation axis is on a straight line (B) connecting the first end and the second end as viewed in the crosswise direction. This configuration can reduce the resistance to movement of the seat cushion provided by the cylinder device when the seat cushion is returned from the frontward tilted position to the initial portion.

BRIEF DESCRIPTION OF THE DRAWINGS

FIG. 7 is a cross-sectional view of a hinge device. FIG. 7(A) shows the hinge device in an initial state, and FIG. 7(B) shows the hinge device in a rotated state;

Figure 1:
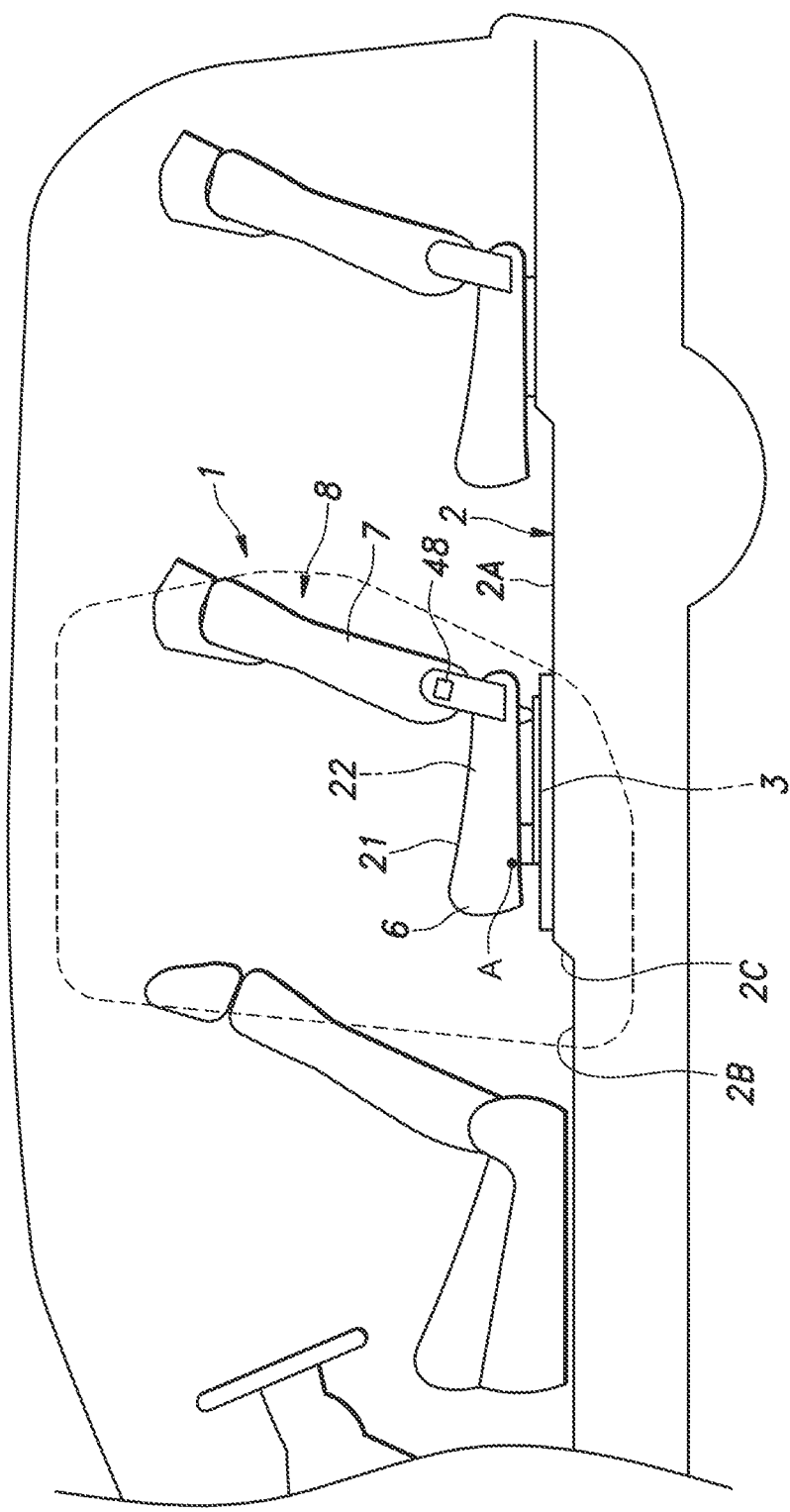
FIG. 1 is an explanatory diagram showing a vehicle in which a seat according to an embodiment of the present invention is mounted.

DESCRIPTION OF THE PREFERRED
EMBODIMENT(S)

Embodiments of a vehicle seat of the present invention will be described in the following with reference to the appended drawings. A vehicle seat of the present invention is used in a three-row vehicle as a seat in the second row.

As shown in FIGS. 1 to 4, a seat 1 includes rail devices 3 provided on a floor 2, a seat cushion 6 supported by the rail devices 3 via respective hinge devices 4 and coupling devices 5, and a seat back 7 extending upward from a rear part of the seat cushion 6. The seat cushion 6 and the seat back 7 are together referred to as a seat body 8. The floor 2 has a high-level section 2A where the rail devices 3 are installed, and a low-level section 2B formed on the front side of and at a lower level than the high-level section 2A. The high-level section 2A and the low-level section 2B are connected to each other via a slope section 2C.

The rail devices 3 are provided on the high-level section 2A of the floor 2 and each rail device includes a lower rail 11 extending in a lengthwise direction (i.e., a front-rear direction of a vehicle), and an upper rail 12 supported by the lower rail 11. The upper rail 12 moves back and forth within a predetermined range relative to the lower rail 11. In the present embodiment, the seat includes the two rail devices 3, each rail device including a set of a lower rail 11 and an upper rail 12, at left and right positions which are separate from each other. Each lower rail 11 is connected to the floor 2 by a front mounting member 13 and a rear mounting member 14. The front mounting member 13 and the rear mounting member 14 may be, for example, a sheet metal member. In other embodiments, the seat may be configured to a front mounting member 13 and a rear mounting member 14 are not used and a lower rail 11 may be directly fastened to the high-level section 2A of the floor 2.

A front mounting member 13 has a rear end portion coupled to the front end of the lower rail 11 and a front end portion coupled to the floor 2 at a location frontward of the front end of the lower rail 11. The front mounting member 13 extends frontward and downward from the front end of the lower rail 11, and is coupled to the slope section 2C of the floor 2 at its front end portion. The front end portion of the front mounting member 13 has a fastening portion 13A fastened to the slope section 2C of the floor 2. The fastening portion 13A of the front mo antrng member 13 is fastened to the slope section 2C of the floor 2 by fastening members such as bolts and nuts.

A position fixing device 16 for fixing the relative position of the upper rail 12 with respect to the lower rail 11 is provided between each lower rail 11 and a corresponding upper rail 12. The position fixing device 16 has a plurality of first engaging teeth (not shown) formed on and along each lower rail 11 and a lever (not shown) rotatable supported by a corresponding upper rail 12. A tip portion of the lever is provided with second engaging teeth (not shown) that can be engaged with the first engaging teeth of the lower rail 11. The lever rotates between its initial position and its release position and is urged toward the initial position. When the lever is in the initial position, the second engaging teeth are engaged with the first engaging teeth, and the position of the upper rail 12 with respect to the lower rail 11 is fixed. When the lever is rotated from the initial position to the release position against the urging force, the second engaging teeth are separated from the first engaging tooth, which enables and the upper rail 12 to slide back and forth with respect to the lower rail 11. The left and right levers are connected to each other by a handle 16A so as to rotate together. The handle 16A is arranged below the seat cushion 6 and can be operated by a passenger. When the handle 16A is operated, the position fixing device 16 enables the position of the upper rail 12 to slide back and forth with respect to the lower rail 11.

A rail urging member (not shown) for urging an upper rail 12 frontward with respect to a lower rail 11 is provided between each lower rail 11 and a corresponding upper rail 12. As a result, when the lever of the position fixing device 16 is moved to the release position, the upper rail 12 receives the urging force of the rail urging member and moves frontward.

The seat cushion 6 is an element for supporting the buttocks of a passenger (occupant). The seat cushion 6 includes a seat cushion frame 20 forming a framework, a pad 21 supported by the seat cushion frame 20, and a skin material 22 for covering the pad 21. The seat cushion frame 20 includes: left and right side members 23 extending in the lengthwise direction; a front member 24 extending in a crosswise direction (i.e., a left-right direction) perpendicular to the lengthwise direction and connected to the front ends of the left and right side members 23; a rear member 25 extending in the crosswise direction and connected to the rear ends of the left and right side members 23; and a submarining prevention member 26 which is located rearward of the front end of the front member 24, extends in the crosswise direction, and is connected to the left and right side members 23, The left and right side members 23 may be formed of, for example, a sheet metal member. The front member 24 and the rear member 25 may be formed of a pipe member or a sheet metal member.

The submarining prevention member 26 is a member for preventing a submarining phenomenon, which can occur when a traveling vehicle crashes head-on into another vehicle or any other object; that is, the waist of a person seated on the seat 1 slides frontward and downward on the surface of the seat 1 even though the seated person is restrained by a seat belt. The submarining prevention member 26 is arranged frontward of the hip-point of a seated person. When a crash occurs, the submarining prevention member 26 stops the movement of the thighs of a seated person via the pad 21, thereby preventing the waist of the seated person from moving frontward.

The left and right ends of the submarining prevention member 26 are welded to side wall portions of the left and right side members 23, respectively. In the present embodiment, the submarining prevention member 26 is a cylindrical pipe. In other embodiments, the submarining prevention pipe may be formed of a square pipe or a sheet metal member.

The submarining prevention member 26 is preferably located rearward of the rear end of the front member 24. Moreover, the submarining prevention member 26 is preferably located rearward of and separated from the front member 24. In other embodiments, the submarining prevention member 26 may be coupled to the front member 24. The submarining prevention member 26 and the front member 24 may be integrally formed by a sheet metal member. In other words, the submarining prevention member 26 may form the rear end portion of the front member 24. In some cases, the rear end of the front member 24 may pass above the submarining prevention member 26 and extend rearward and out of the rear end of the submarining prevention member 26.

A plate-shaped pressure receiving member 28 extending in the lengthwise direction is laid across the submarining prevention member 26 and the rear member 25. The pressure receiving member 28 extends downward and rearward from the submarining prevention member 26, and then extends upward and rearward to reach the rear member 25.

The seat cushion frame 20 has a skin material supporter 31 extending downward from a side member 23 in order to secure an edge portion of the skin material 22 in place. The skin material supporter 31 is formed by bending a metal rod and the front and rear ends of skin material supporter 31 are welded to the side member 23. The intermediate portion of the skin material supporter 31 extending in the lengthwise direction is located below the front and rear ends. The intermediate portion of the skin material supporter 31 extends horizontally in the lengthwise direction and is located below the lower wall portion of the side member 23. One or more hooks provided at the edge of the skin material 22 are used to attach the skin material 22 to the skin material supporter 31.

The seat back 7 is supported on the rear part of the seat cushion 6 via a reclining device (not shown) so that the angle of the seat back 7 can be adjusted with respect to the seat cushion 6. When the seat 1 is used, the seat back 7 extends upward and rearward from the rear part of the seat cushion 6.

A hinge device 4 has a rotation axis A extending in the left-right direction, and rotatably connects the front part of the upper rail 12 and the front part of the seat cushion 6. In the present embodiment, left and right hinge devices 4 are provided for the two sets of the upper rail 12 and the side member 23 on the left and right sides, respectively. The rotation axes A of the left and right hinge devices 4 are arranged coaxially with each other.

As shown in FIGS. 2 to 7, each hinge device 4 includes a first member 33 coupled to the upper rail 12, a shaft 34 supported by the first member 33 and extending in the crosswise direction, and a second member 35 rotatably supported by the shaft 34 and coupled to ta corresponding side member 23. The first member 33 is formed by combining a plurality of sheet metal members. The first member 33 includes the first base portion 33A coupled to the upper rail 12, and left and right first side wall portions 33B extending upward from the first base portion 33A and spaced apart from each other in the crosswise direction. The first base portion 33A is formed in a rectangular parallelepiped shape extending in the lengthwise direction. The left and right first side wall portions 33B extend in the lengthwise direction and along the left and right side edges of the first base portion 33A, respectively, and extend upward so as to face each other. In the present embodiment, the first member 33 is formed by combining first to third sheet metal members 33C to 33E. The first sheet metal member 33C forms an upper wall of the first base portion 33A and the left and right first side wall portions 33B, and is formed in a groove shape. The second sheet metal member 33D forms an upper wall, a front side wall, and a rear side wall of the first base portion 33A, and is formed in a groove shape. The third sheet metal member 33E forms a lower wall of the first base portion 33A and left and right side walls, and is formed in a groove shape. The first to third sheet metal members 33C to 33E are connected to each other by welding or fastening bolts or any other connecting means. In other embodiments, the second and third sheet metal members 33D and 33E are not used. In this case, the left and right first side walls may be made vertically longer so that the first member 33 has the same height as the present embodiment.

The lower wall of the first base portion 33A of the first member 33 is fastened to the upper part of the upper rail 12 by a fastening member such as a bolt. The lower wall of the first base portion 33A is preferably fastened to the upper part of the upper rail 12 at least at two positions which are separated from each other in the lengthwise direction.

The shaft 34 is laid across the left and right first side wall portions 33B. The shaft 34 constitutes a rotation axis of the hinge device 4, and the central axis of the shaft 34 is the rotation axis A of the hinge device 4. The shaft 34 is located at the front and upper end portions of the left and right first side wall portions 33B.

The second member 35 includes a second base portion 35A coupled to a side member 23, and left and right second side wall portions 35B extending downward from the second base portion 35A and spaced apart from each other in the crosswise direction. The lower edges of the left and right second side wall portions 35B are inclined to extend upward and rearward. The second member 35 may be formed by bending one sheet metal member. The left and right second side wall portions 35B are located between the left and right first side wall portions 33B, respectively, and are rotatably supported by the shaft 34. The left and right second side wall portions 35B are supported by the shaft 34 at their front and lower end portions.

The second base portion 35A of the second member 35 is fastened to the lower wall portion of the side member 23 by a fastening member such as a bolt. The second base portion 35A is preferably fastened to the lower wall portion of the side member 23 at least at two positions separated from each other in the lengthwise direction.

As shown in FIG. 7, the hinge device 4 includes a first restriction portion 37 provided on one of the first member 33 and the second member 35; and a second restriction portion 38 provided on the other of the first member 33 and the second member 35 so that the second restriction portion can abut the first restriction portion to thereby restrict the relative rotation of the second member 35 to the first member 33, defining a relative rotation range. In the present embodiment, the first restriction portion 37 is formed in a columnar shape, extends in the crosswise direction, and is connected to the left and right first side wall portions 33B. The first restriction portion 37 is located rearward of the shaft 34. The second restriction portion 38 is formed of the lower edges of the left and right second side wall portions 35B, and convex portions protruding downward from the lower edges.

When the second member 35 rotates upward and and frontward with respect to the first member 33 about the rotation axis A, a "frontward rotation" is made, and when the second member 35 rotates with respect to the first member 33 in the opposite direction, a "rearward rotation" is made. The hinge device 4 can make the frontward and rearward rotations between an initial state where the first and second members are at one end of the relative rotation range, and a rotated state where the first and second members are at the other end of the relative rotation range. When the hinge device 4 is in the initial state, the second restriction portion 38, which is formed of the lower edges of the left and right second side wall portions 35B, comes into contact with the first restriction portion 37. Thus, in the initial state, the hinge device 4 is restricted from making a rearward rotation. When the hinge device 4 is in the initial state, the seat cushion 6 extends substantially horizontally and is in a use position where a person can be seated thereon. When the hinge device 4 is in the initial state, the convex portions forming the second restriction portion 38 are separated from and located below and frontward of the shaft 34.

When the hinge device 4 is in the rotated state, the convex portion of the second restriction portion 38 comes into contact with the first restriction portion 37. Thus, in the rotated state, the hinge device 4 is restricted from making a frontward rotation. When the hinge device 4 is in the rotated state, the seat cushion 6 is in a frontward tilted state, in which the rear end of the hinge device is above the front end thereof. As the hinge device 4 makes a frontward rotation from the initial state to the rotated state, the angle of the seat cushion 6 preferably changes by an angle in the range between 10 degrees and 45 degrees, for example.

Figure 5:
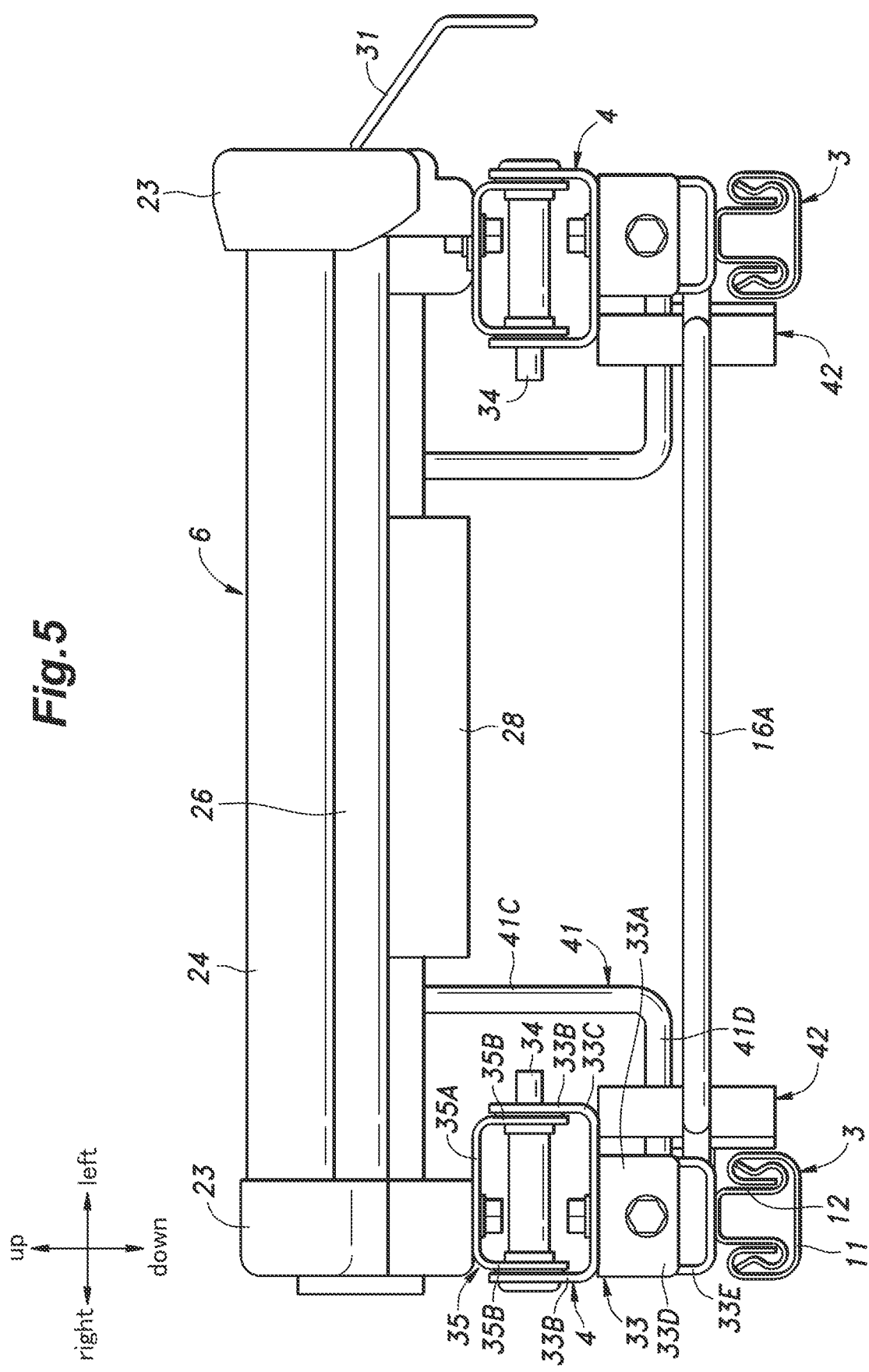
FIG. 5 is a front view of the lower structure of the seat

As shown in FIG. 5, the first member 33 of the hinge device 4 has a greater width measured in the crosswise direction than the lower rail and preferably protrudes more inward than the lower rail. As a result, even when a larger hinge device 4 is used to achieve an increased rigidity of the hinge device 4, the outer shape of the vehicle seat 1 becomes less affected by the use of such a larger hinge device 4.

Figure 3:
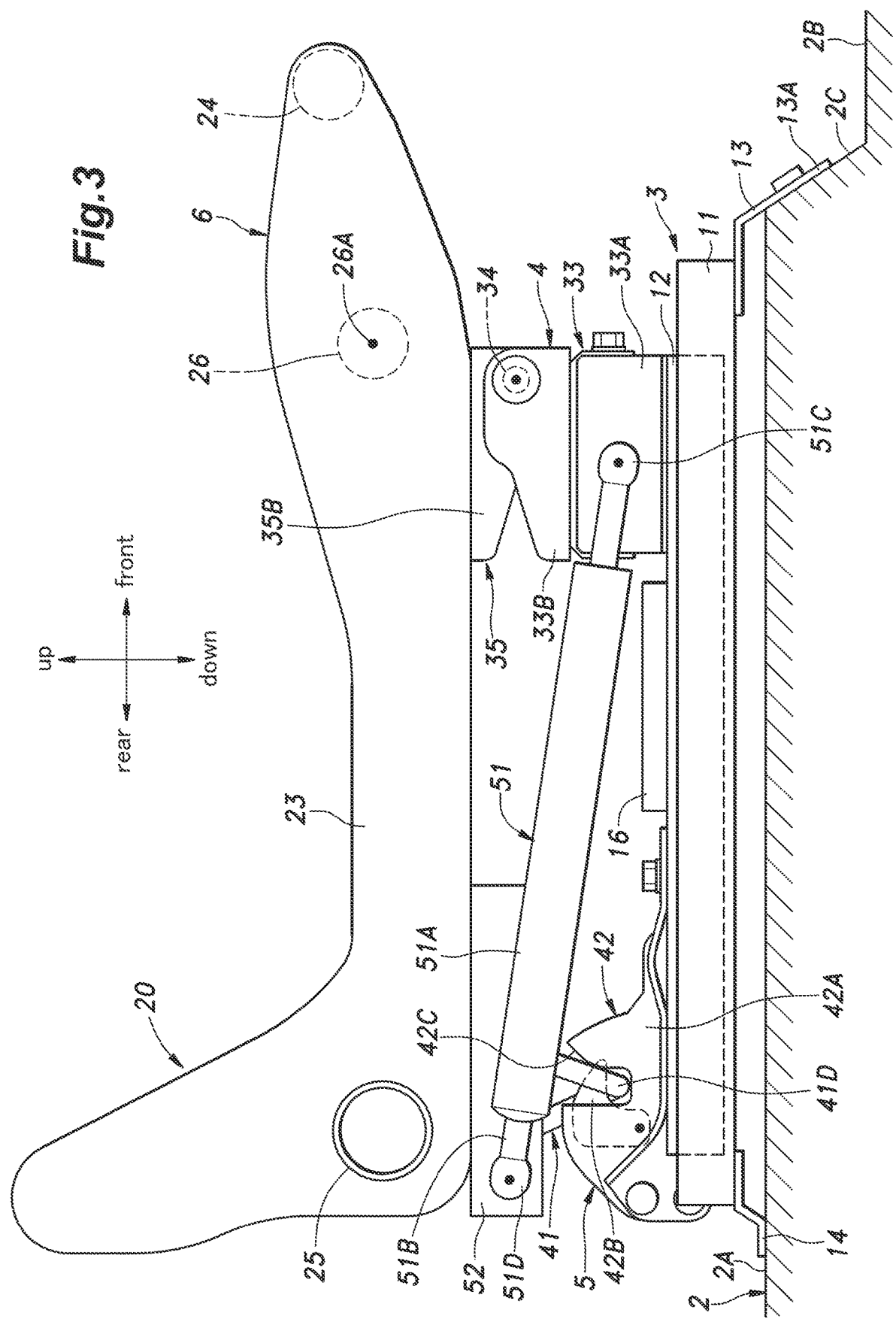
FIG. 3 is a right side view of the lower structure of the seat.
Figure 4:
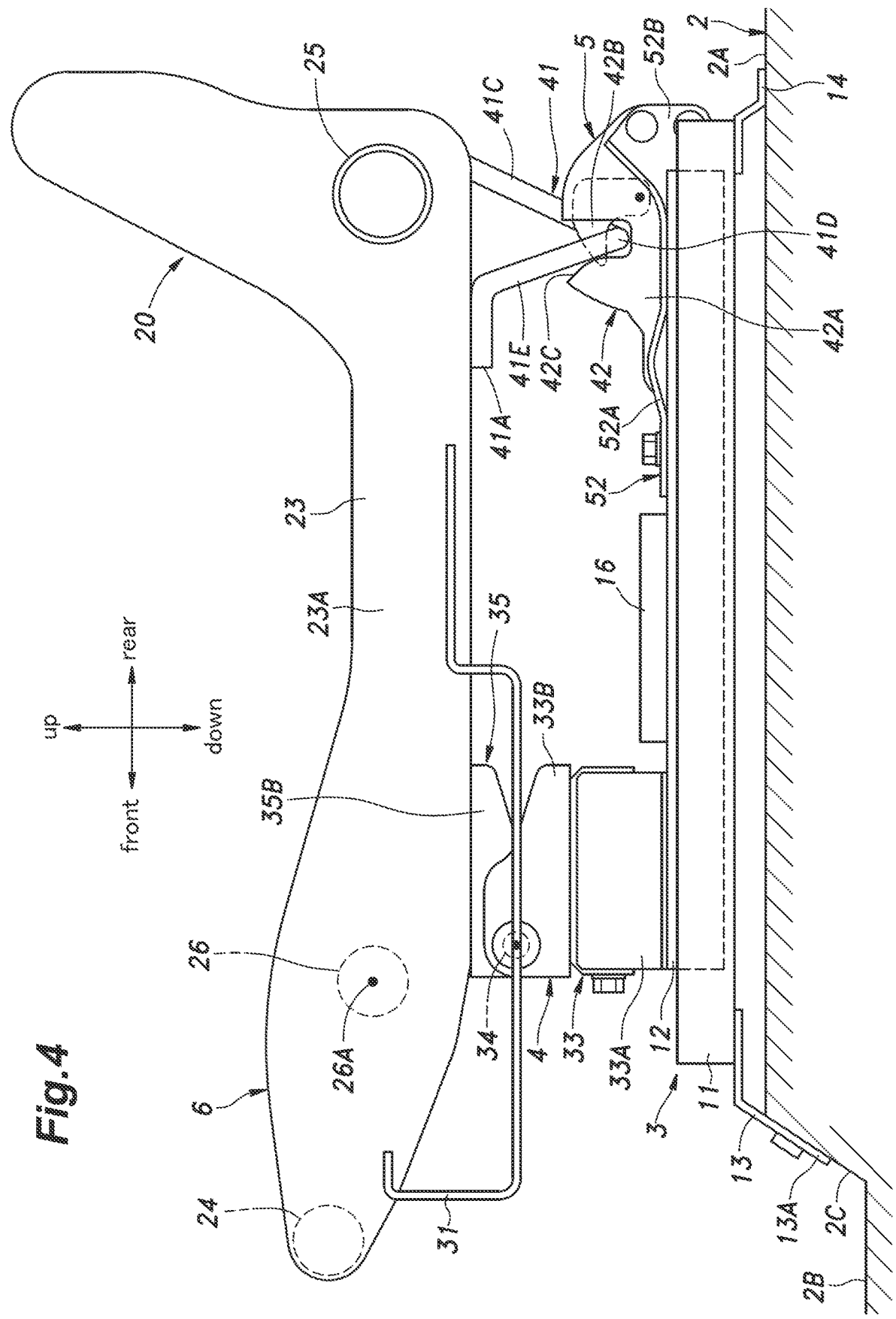
FIG. 4 is a left side view of the lower structure of the seat.

The coupling device 5 detachably connects the rear part of the seat cushion 6 to the rear part of the upper rail 12. The coupling device 5 includes a striker 41 provided on one of the upper rail 12 and the seat cushion frame 20, and a locking device 42 provided on the other of the upper rail 12 and the seat cushion frame 20 and configured to detachably lock the striker 41. As shown in FIGS. 3 and 4, in the present embodiment, the striker 41 is provided on the rear part of the seat cushion frame 20, and the locking device 42 is provided on the upper rail 12. Thus, the seat includes two sets of the striker 41 and the locking device 42 on the left and right sides, respectively.

Each striker 41 is formed by bending a metal rod. Each striker 41 has a first end 41A coupled to the rear member 25 and a second end 41B coupled to a corresponding side member 23, The second end 41B is connected to the rear end part of the lower wall portion of the side member 23. The second end 41B is located laterally outward and frontward of the first end 41A. The striker 41 includes a striker rear portion 41C extending linearly frontward and downward from the first end 41A, a striker middle portion 41D extending horizontally outward from the lower end of the striker rear portion 41C, and a striker front portion 41E extending linearly upward and frontward toward the second end 41B from the outer end of the striker middle portion 41D. The striker 41 is formed in a V shape when viewed from the side.

Figure 2:
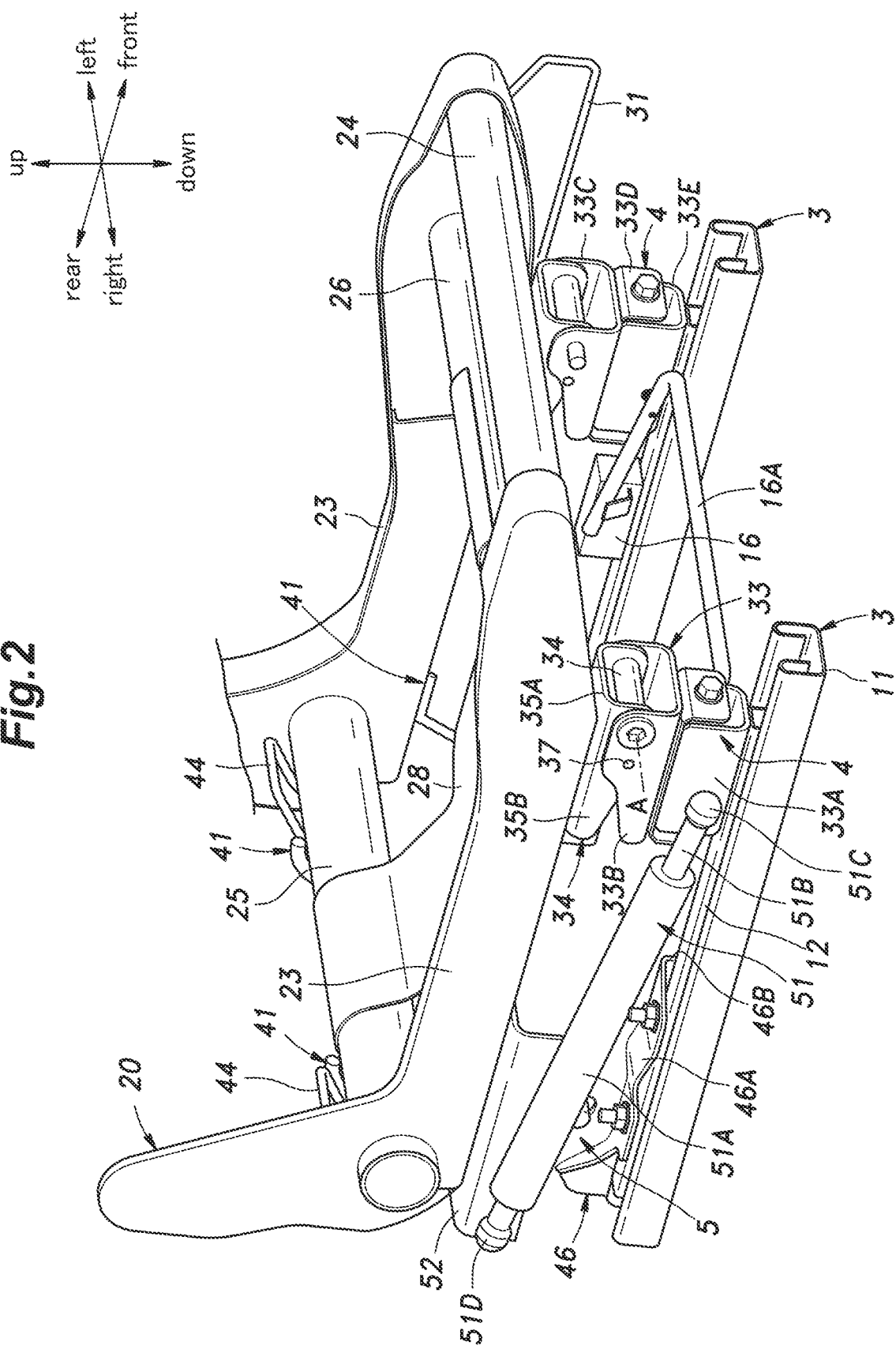
FIG. 2 is a perspective view showing a lower structure of the seat.
Figure 6:
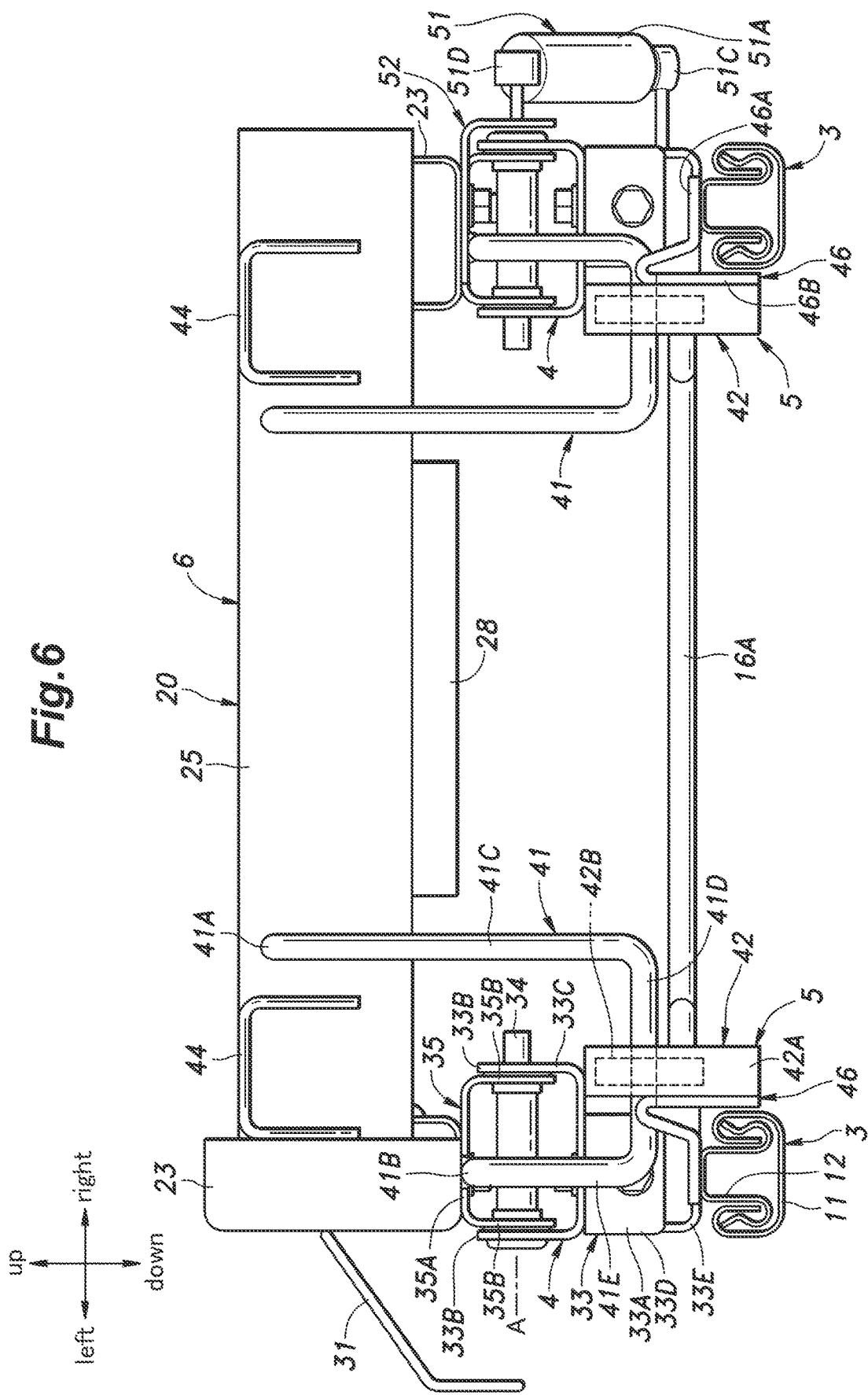
FIG. 6 is a rear view of the lower structure of the seat.

As shown in FIGS. 2 and 6, the rear member 25 is provided with left and right child seat anchors 44. A child seat anchor 44 is formed in a U shape by bending a metal rod. The child seat anchor 44 has a shape that is in conformity with the international standard for attachment points for child safety seats (ISOFIX). The left child seat anchor 44 is located between the left end portion of the rear member 25 and the first end 41A of the left striker 41. Specifically, the first end 41A of the left striker 41 is located at a location on the right side of the left child seat anchor 44 so as to avoid interference with the left child seat anchor 44. The arrangement of the right striker 41 and the right child seat anchor 44 may be symmetrical to that of the left striker 41 and the left child seat anchor 44. In other embodiments, the first end 41A of each striker 41 and one end of a corresponding child seat anchor 44 may be connected to each other. In other words, the striker 41 and the corresponding child seat anchor 44 may be formed by bending one metal rod.

As shown in FIGS. 3 and 4, each of the left and right locking devices 42 is coupled to the rear end of a corresponding upper rail 12 via a bracket 46. The bracket 46 is formed of a sheet metal member. The bracket 46 is fastened to the upper part of the rear end portion of the upper rail 12 and includes an upper plate portion 46A extending inward from the upper rail 12, and a vertical plate portion 46B extending downward from the inner end of the upper plate portion 46A. The vertical plate portion 46B extends along the inner side of the lower rail 11. The locking device 42 includes a casing 42A forming an outer shell and a hook 42B rotatably supported by the casing 42A. The casing 42A is coupled to the vertical plate portion 46B and is located adjacent to the inner side of the lower rail 11. A curved slot 42C is defined in and extends downward from the upper part of the casing 42A. The slot 42C extends through the casing 42A in the crosswise direction, and opens upward. The slot 42C is defined such that it can receive the striker middle portion 41D.

The hook 42B is disposed within the casing 42A and is rotatable between a locked position where the hook crosses the slot 42C and an unlocked position where the hook is retracted from the slot 42C. The hook 42B is urged toward the locked position by a spring. When the hook 42B is in the locked position, the hook prevents the striker middle portion 41D in the slot 42C from moving away from the slot 42C.

When the hook 428 moves from the locked position to the unlocked position, the striker middle portion 41D in the slot 42C can move away from the slot 42C. A cam surface is formed on the upper edge of a portion of the hook 42B that can cross the slot 42C. When the striker middle portion 41D pushes the cam surface downward from above, the hook 42B moves from the locked position to the unlocked position. As a result, even when the hook 42B is in the locked position, the striker middle portion 41D can push the hook 42B away and move into the slot 42C.

As shown in FIG. 1, the hook 42B is connected to an operating lever 48 via a control cable (not shown). A user can change the locking device 42 from the locked state to the unlocked state by operating the operating lever 48. The operating lever 48 may be provided at the rear end of the seat cushion 6 or the back surface of the seat back 7.

As shown in FIG. 3, an urging device 51 is provided between a lower member that moves together with the first member 33 and an upper member that moves together with the second member 35. The lower member includes the first member 33 and the upper rail 12, and the upper member includes the second member 35, the side member 23, and the rear member 25. The urging device 51 is configured to be telescopically expandable along a straight line, and tends to expand, providing an urging force. As the urging device 51 expands, the hinge device 4 changes from the initial state to the rotated state. The urging device 51 includes a cylinder 51A and a rod 51B capable of telescopically expanding with respect to the cylinder 51A. The rod 51B is urged to expand with respect to the cylinder 51A. In the present embodiment, the urging device 51 is a known gas spring in which a high-pressure gas is sealed in the cylinder 51A. In other embodiments, the urging device 51 may urge the rod 51B with respect to the cylinder 51A by another urging means such as a compression coil spring. As the urging device 51 contracts, the urging device 51 generates a resistance force caused due to the compression of the high-pressure gas, functioning as a damping device.

In the present embodiment, a first end 51C of the urging device 51 is rotatably coupled to the first member 33 of the hinge device 4. A second end MD of the urging device 51 is rotatably coupled to a bracket 52 provided at the rear end of the side member 23. The bracket 52 extends downward from the rear end of the side member 23. In other embodiments, the urging device 51 does not include any bracket 52, and the second end 51D may be directly coupled to the side member 23. The first end 51C of the urging device 51 is located below the rotation axis A.

Details of the position of the rotation axis A of the hinge device 4 and the seat body 8 will be described below. The rotation axis A is located rearward of the central axis of the submarining prevention member 26. The position of the submarining prevention member 26 is determined based on where the submarining prevention member 26 is connected to the side members 23; that is, the positions of both ends of the submarining prevention member 26. This configuration can reduce an amount of lift at the rear part of the tilted seat cushion 6 per a certain change in the angle of tilt of the seat cushion 6, compared to the case that the rotation axis A is provided at the front end of the seat cushion 6. As a result, a relatively smaller space is formed under the seat cushion 6 when the seat cushion 6 is tilted frontward Preferably, the rotation axis A is located frontward of the rear end of the submarining prevention member 26. This configuration can reduce an amount of lift at the rear part of the seat cushion 6 while simultaneously reducing an amount of drop at the front part of the seat cushion 6 when the seat cushion 6 is tilted frontward.

Preferably, the rotation axis A extends above the upper rail 12 and is located at the same position along the lengthwise direction as or rearward of the front end of the upper rail 12. In this configuration, since the rotation axis A is located above the upper rail 12, even when the seat cushion 6 is tilted frontward, a load is applied downward from the seat cushion 6 to the upper rail 12 via the hinge device. 4 As a result, the upper rail 12 can support the seat cushion 6 in a stable manner.

Preferably, the rotation axis A is located at the level of or above the lower end of the skin material supporter 31. In this configuration, the rotation axis A is located near the side members 23, which reduces an amount of upward or downward movement at the rear part of the seat cushion 6 as the angle of the seat cushion 6 changes.

Preferably, the rotation axis A is located below the lower end of each side member 23. In this configuration, the hinge device 4 can be located below the side members 23, thereby enabling the seat 1 to have a simple structure.

Preferably, when the upper rail 12 is located its frontmost position relative to the lower rail 1, the rotation axis A is located rearward of the front end of the front mounting member 13. Moreover, when the upper rail 12 is located its frontmost position relative to the lower rail 11, the rotation axis A may be located rearward of the fastening portion 13A. In these configurations, the rotation axis A is located above at least one of the front mounting member 13 and the lower rail 11. As a result, even when the seat cushion 6 is tilted frontward, the seat cushion 6 can be stably supported by the front mounting member and the lower rail 11.

Preferably, the rotation axis A is located above the upper end of the locking device 42. In this configuration, the rotation axis A is located near the side members 23, which reduces an amount of upward or downward movement at the rear part of the seat cushion 6 as the angle of the seat cushion 6 changes.

Next, how the seat 1 operates according to the present embodiment will be described. When the seat 1 is in the initial state as shown in FIGS. 1 to 6, the rear part of the seat cushion 6 is coupled to the rear portion of the upper rail 12 by the coupling device 5. In this state, a passenger can operate to reclining device to adjust the angle of the seat back 7 with respect to the seat cushion 6. The passenger also can operate the handle 16A to adjust the position of the upper rail 12 with respect to the lower rail 11 in the lengthwise direction.

Figure 8:
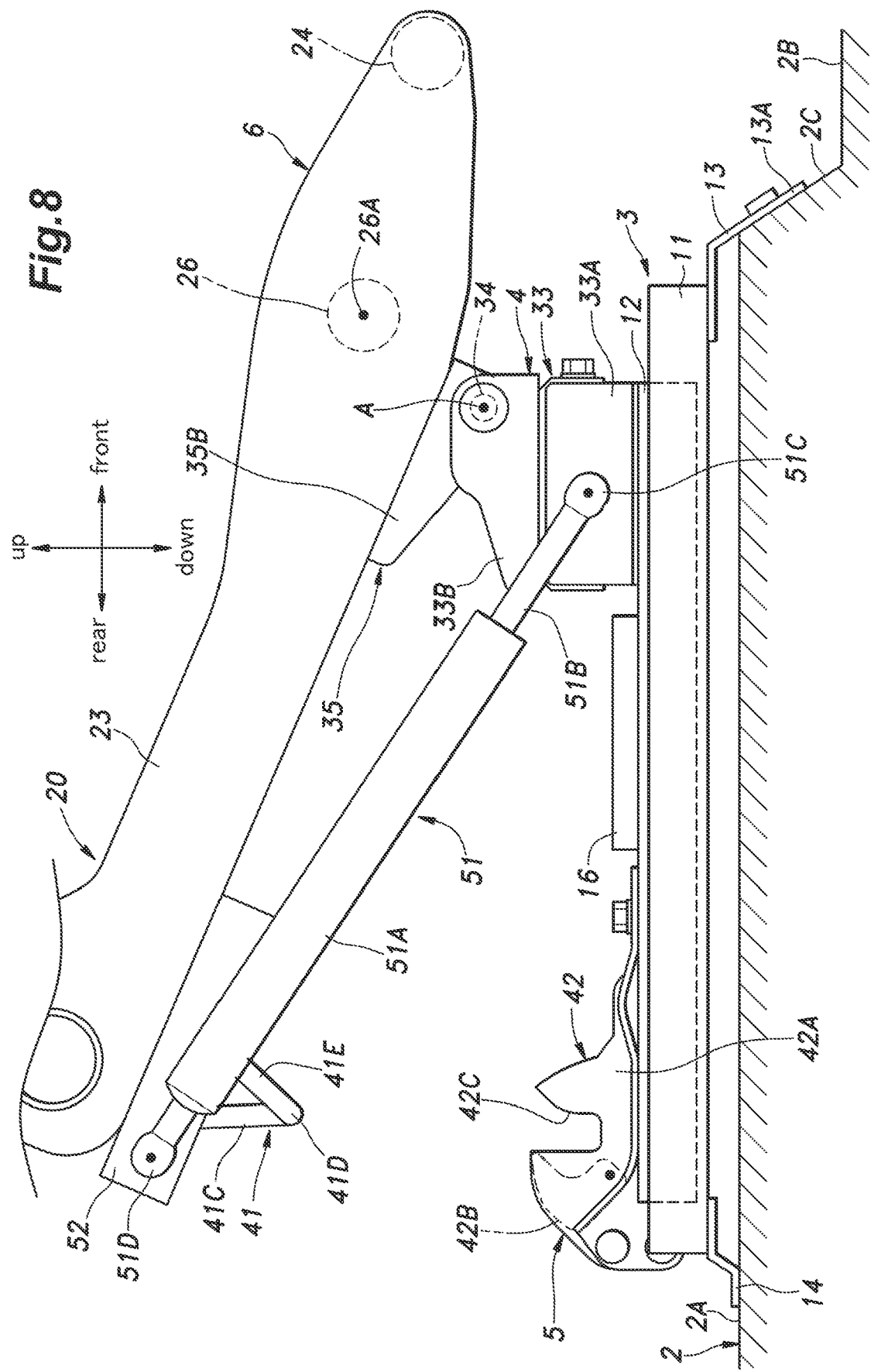
FIG. 8 is a left side view of the lower structure of the seat in a frontward tilted position.
Figure 9:
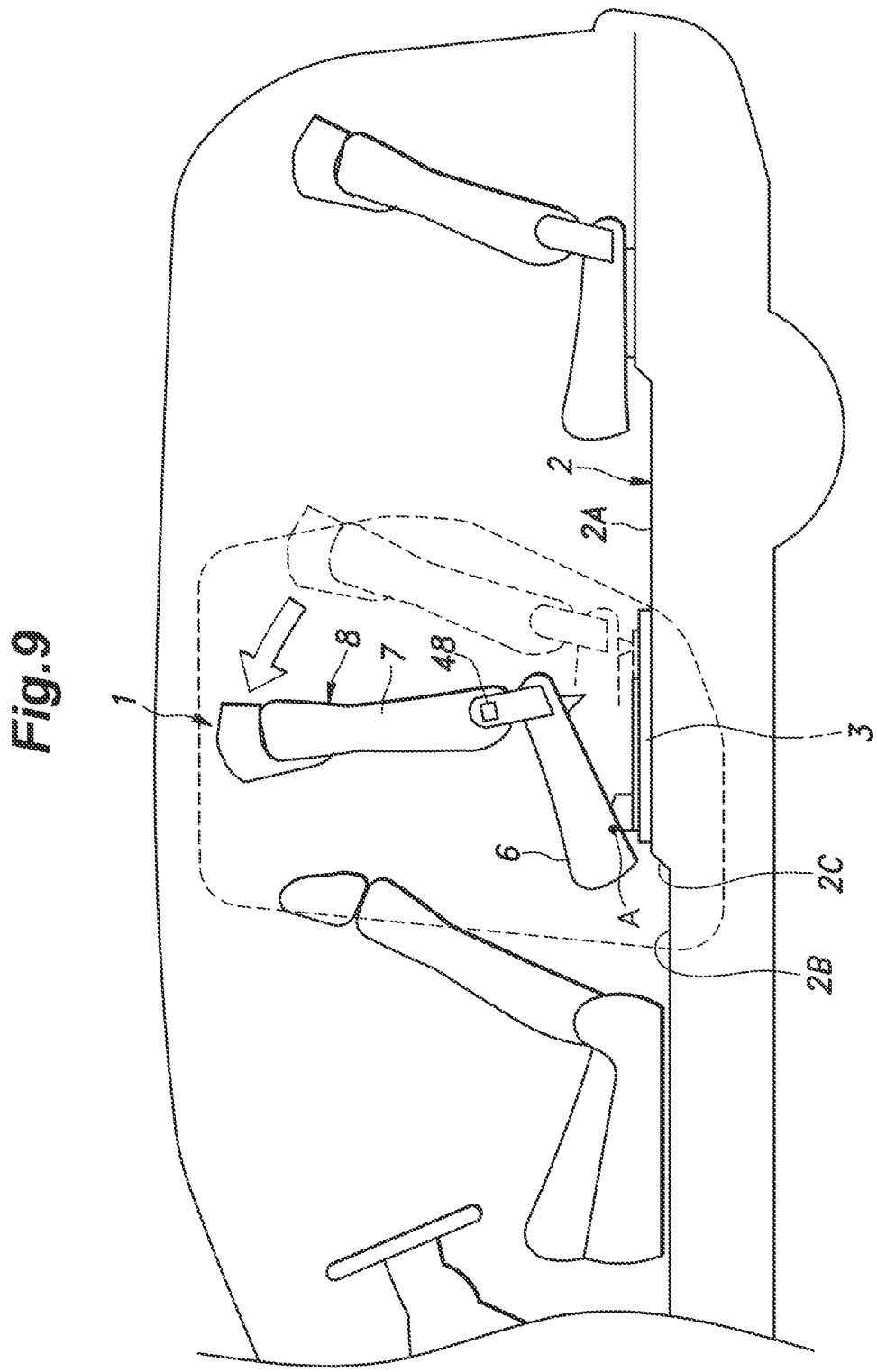
FIG. 9 is an explanatory diagram showing a vehicle in which the seat is in the frontward tilted position.

When a passenger needs to get on and off a vehicle through a space behind the seat 1, the passenger operates the operating lever 48. As a result, the hook 42B, which is connected to the operating lever 48 via the control cable, moves from the locked position to the unlocked position, and the locking device 42 is brought into the unlocked state. When the locking device 42 is in the unlocked state as shown in FIG. 8, the urging force of the urging device 51 causes the seat body 8 to move from the initial position toward the frontward tilted position. Then, when the seat cushion 6 reaches the frontward tilted position, a pressing piece (not shown) provided at the bottom of the seat cushion 6 pushes the handle 16A, and the position fixing device 16 of the rail device 3 is unlocked. As a result, the upper rail 12 receives the urging force of the rail urging member and moves to the front end position. In this way, when a passenger operates the operating lever 48, the seat body 8 tilts and slides frontward as shown in FIG. 9. This creates a passage behind the seat 1, enabling a passenger to get on and off the vehicle.

Figure 10:
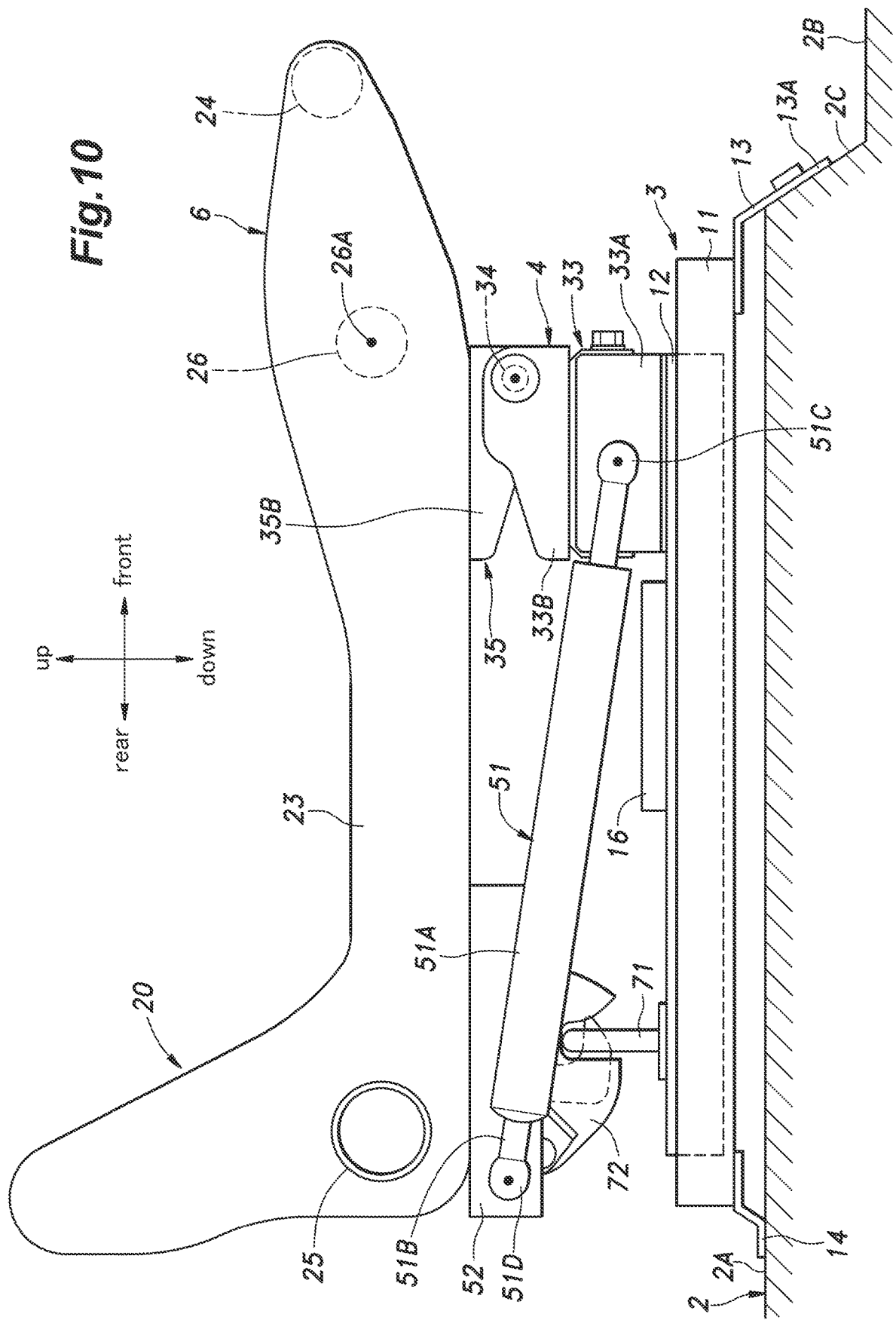
FIG. 10 is a right side view of a lower structure of a seat according to a modification of the embodiment of the present invention.

Specific embodiments of the present disclosure are described above. However, the present disclosure is not limited to those specific embodiments, and various changes may be made to the embodiments. For example, as shown in FIG. 10, a striker 71 may be provided at the rear end of each upper rail 12, and a locking device 72, which can be detachably engaged with the striker 71, may be provided at the rear end of a corresponding side member 23. The configuration of the striker 71 may be the same as that of the striker 41, and the configuration of the locking device 72 may be the same as that of the locking device 42.

Figure 11:
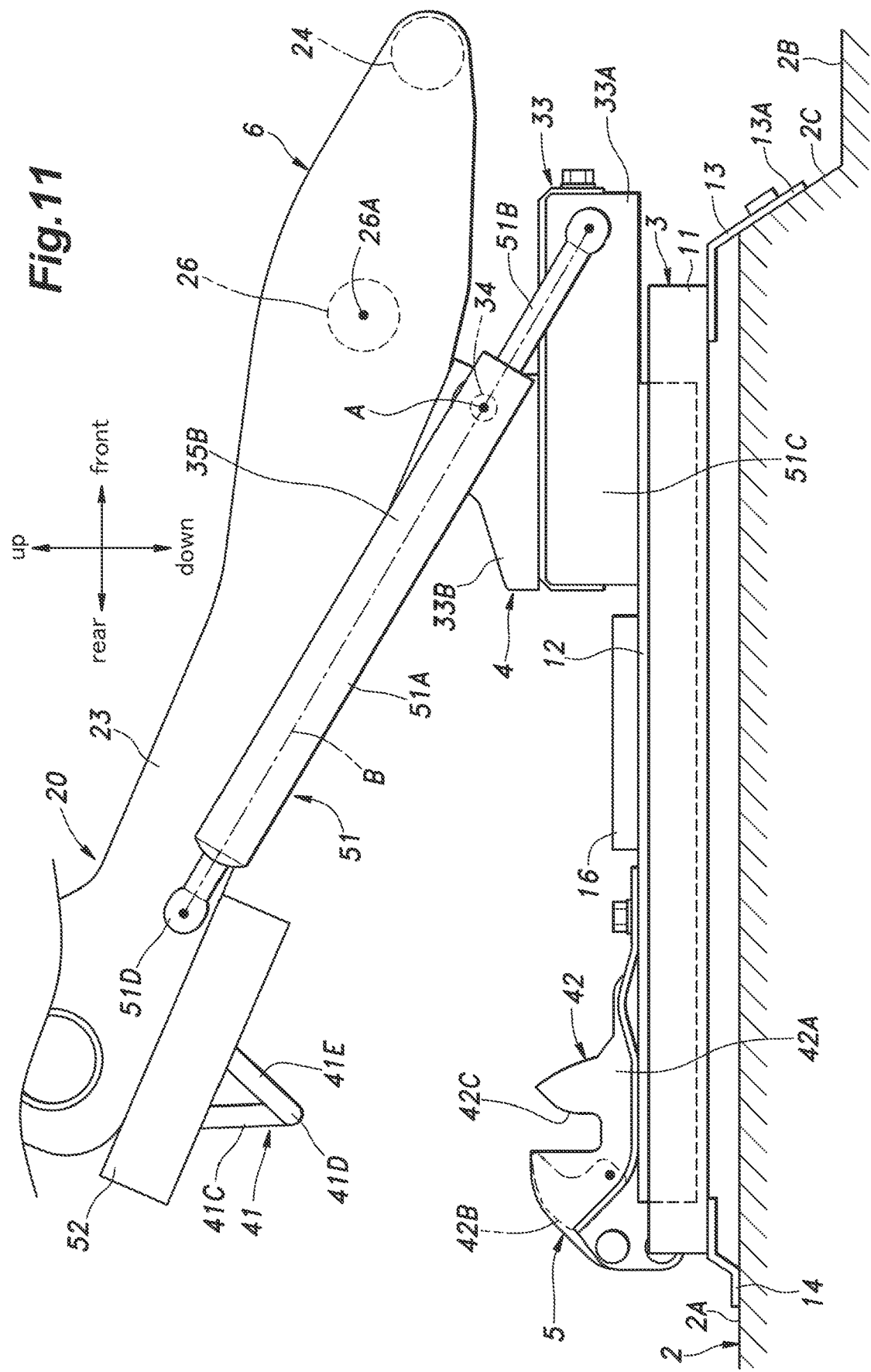
FIG. 11 is a left side view of the lower structure of the seat of the modification of the embodiment.

In other embodiments, as shown in FIG. 11, the first member 33 of the hinge device 4 may extend to a location frontward of the rotation axis A, and the first end 51C of the urging device 51 may be located frontward of the rotation axis A. In this case, when the seat body 8 is in the frontward tilted position after rotation around the rotation axis A, the rotation axis is preferably on the straight line B connecting the first end 51C and the second end 5lD as viewed in the crosswise direction. This configuration can reduce the resistance to movement of the seat cushion 6 provided by the urging device 51 when the seat cushion 6 is returned from the frontward tilted position to the initial portion.

In addition, the urging device 51 may be a torsion coil spring provided between the first member 33 and the second member 35, The coil portion of the torsion coil spring is preferably supported by the outer periphery of the shaft 34.

Figure 12:
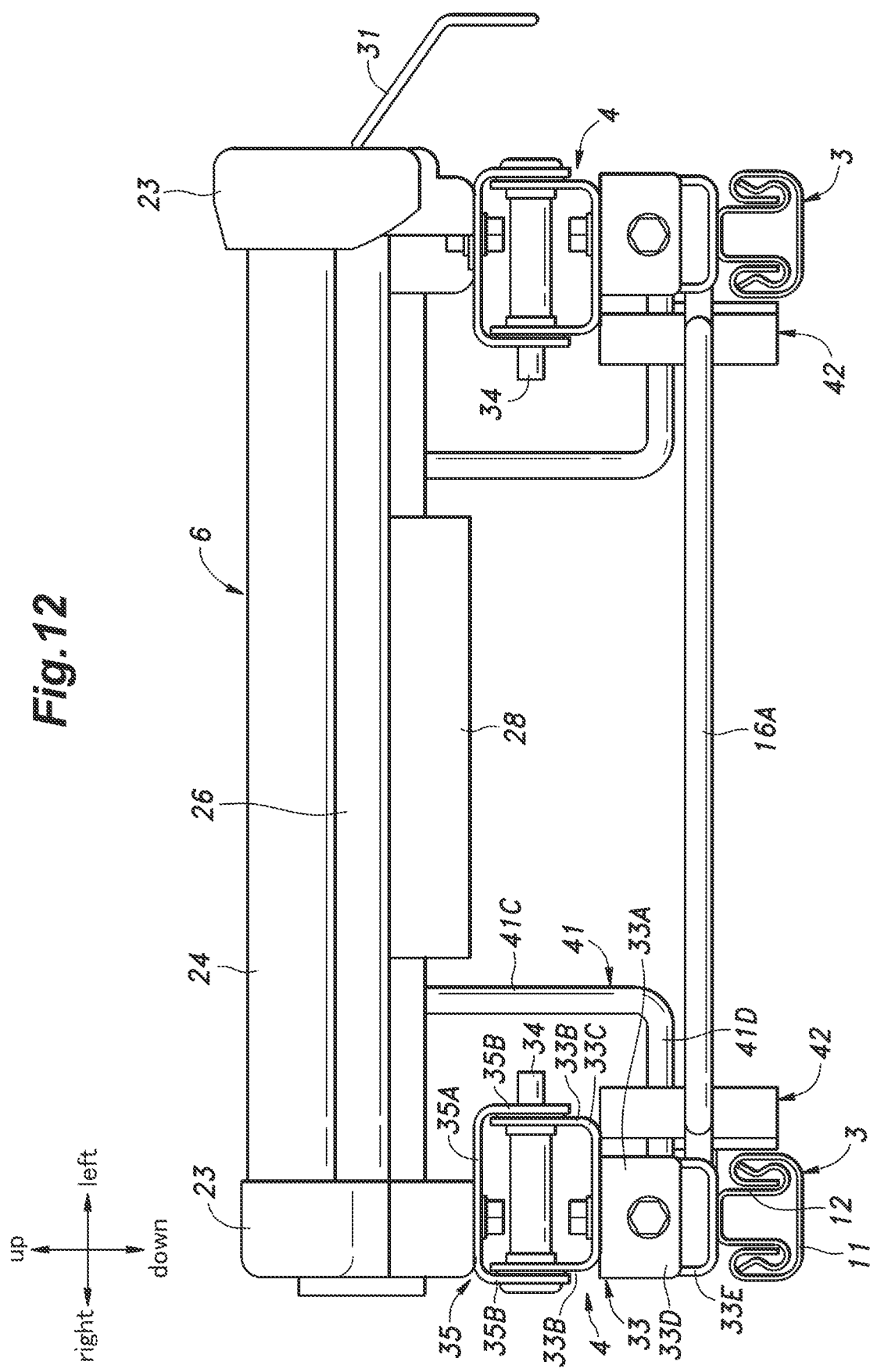
FIG. 12 is a front view of the lower structure of a hinge device according to the modification of the embodiment.

As shown in FIG. 12, the hinge device 4 may be configured such that the second member 35 has a greater width measured in the crosswise direction than the first member 33. In this case, the left and right first side wall portions 33B are preferably arranged between the left and right second side wall portions 35B, The shaft 34 may extend in the crosswise direction through the left and right first side wall portions 33B and though the left and right second side wall portions 35B.

Glossary 1 seat
2 floor
3 rail device
4 hinge device
5 coupling device
6 seat cushion
7 seat back
8 seat body
11 lower rail
12 upper rail
13 from mounting member
13A fastening portion
20 seat cushion frame
23 side member
24 front member
25 rear member
26 submarining prevention member
31 skin material supporter
33 first member
33A first base portion
33B: first side wall portion
34 shaft
35 second member
35A second base portion
35B second side wall portion
37 first restriction portion
38 second restriction portion
41 striker
42 locking device
42B hook
51 urging device
51C first end
51D second end
A rotation axis
B straight line

The invention claimed is:

1. A vehicle seat, comprising:
   a seat body including a seat cushion for supporting buttocks of a passenger, and a seat back extending upward from a rear part of the seat cushion; and
   at least one mechanical structure, each mechanical structure comprising:
   a rail device provided on a floor, the rail device including a lower rail extending in a lengthwise direction, the lengthwise direction being a front-rear direction of a vehicle, and an upper rail supported by the lower rail;
   a hinge device for rotatably connecting a front part of the upper rail and a front part of the seat cushion, the hinge device having a rotation axis which extends in a crosswise direction perpendicular to the lengthwise direction; and
   a coupling device for detachably connecting the rear part of the seat cushion and a rear part of the upper rail,
   wherein the seat cushion is provided with a seat cushion frame, the seat cushion frame comprising:
   left and right side members extending in the lengthwise direction;
   a front member extending in the crosswise direction and coupled to respective front end portions of the left and right side members;
   a rear member extending in the crosswise direction and coupled to respective rear end portions of the left and right side members; and
   a submarining prevention member located rearward of the front end of the front member, extending in the crosswise direction, and coupled to the left and right side members, and
   wherein the rotation axis of the hinge device is located rearward of a central axis of the submarining prevention member.

2. The vehicle seat according to claim 1, wherein the submarining prevention member is a cylindrical pipe.

3. The vehicle seat according to claim 1, wherein the submarining prevention member is located rearward of the rear end of the front member.

4. The vehicle seat according to claim 1, wherein the rotation axis is located frontward of the rear end of the submarining prevention member.

5. The vehicle seat according to claim 1, wherein the rotation axis extends above the upper rail and is located at the same position along the lengthwise direction as or rearward of the front end of the upper rail.

6. The vehicle seat according to claim 1, wherein the seat cushion includes a pad supported by the seat cushion frame and a skin material configured to cover the pad,
   wherein the seat cushion frame is provided with a skin material supporter which extends downward from at least one of the left and right side members and can secure an edge portion of the skin material in place, and wherein the rotation axis is located on the same level or above the lower end of the skin material supporter.

7. The vehicle seat according to claim 6, wherein the rotation axis is located below the lower ends of the left and right side members.

8. The vehicle seat according to claim 1, wherein each mechanical structure further comprises a mounting member, the mounting member having a rear end portion coupled to the front end of the lower rail, and a front end portion located frontward of the front end of the lower rail and coupled to the floor, wherein, when the upper rail is located its frontmost position relative to the lower rail, the rotation axis is located rearward of the front end of the mounting member.

9. The vehicle seat according to claim 8, wherein the mounting member is provided with a fastening portion to be fastened to the floor, and wherein, when the upper rail is located its frontmost position relative to the lower rail, the rotation axis is located rearward of the fastening portion.

10. The vehicle seat according to claim 1, wherein the coupling device includes: a striker provided on one of the upper rail and the seat cushion frame; and a locking device provided on the other of the upper rail and the seat cushion frame and configured to detachably lock the striker, and wherein the rotation axis is located above the upper end of the locking device.

11. The vehicle seat according to claim 1, wherein the vehicle seat comprises at least two of the mechanical structures, and wherein, for each mechanical structure, the hinge device comprises:

a first member to be connected to the upper rail;

a shaft supported by the first member and extending in the crosswise direction;

a second member rotatably supported by the shaft and coupled to a corresponding one of the left and right side members, a first restriction portion provided on one of the first member and the second member; and a second restriction portion provided on the other of the first member and the second member so that the second restriction portion can abut the first restriction portion to thereby restrict the relative rotation of the second member to the first member, defining a relative rotation range.

12. The vehicle seat according to claim 11, wherein the first member has a greater width measured in the crosswise direction than the lower rail and protrudes more inward than the lower rail.

13. The vehicle seat according to claim 11, wherein the first member comprises a first base portion coupled to the upper rail, and left and right side first wall portions extending upward from the first base portion and spaced apart from each other in the crosswise direction, wherein the second member comprises a second base portion coupled to a corresponding one of the left and right side members, and left and right side second wall portions extending downward from the second base portion and spaced apart from each other in the crosswise direction, wherein the left and right first side wall portions are located between the left and right second side wall portions in the crosswise direction, and wherein the shaft extends in the crosswise direction through the left and right first side wall portions and through the left and right second side wall portions.

14. The vehicle seat according to claim 11, wherein each mechanical structure is provided with an urging device configured to be telescopically expandable along a straight line, the urging device having a first end coupled to the first member and a second end coupled to the rear end of a corresponding one of the left and right side members, and wherein the urging device tends to expand, providing an urging force.

15. The vehicle seat according to claim 14, wherein the first member extends out frontward of the rotation axis, and wherein the first end of the urging device is located frontward of the rotation axis.

16. The vehicle seat according to claim 15, wherein, when the seat body is in a frontward tilted position in which the seat body is tilted frontward about the rotation axis, the rotation axis is on a straight line connecting the first end and the second end as viewed in the crosswise direction.

* * * * *